Patented May 2, 1944

2,347,772

UNITED STATES PATENT OFFICE 2,347,772

ALIPHATIC DICARBYLAMINES AND PROCESS OF PRODUCING THEM

Henry Dreyfus, London, England, assignor to Celanese Corporation of America, a corporation of Delaware No Drawing. Application March 10, 1942, Serial No. 434,064. In Great Britain March 10, 1941

10 Claims. (Cl. 260—464)

This invention relates to the production of new and useful organic compounds and is particularly concerned with the production of certain carbylamines.

According to the invention organic compounds containing two —NH$_2$ groups are subjected to reaction with a highly halogenated derivative of methane and a caustic alkali to produce a dicarbylamine.

Important embodiments of the invention are the production of ethylene, tetramethylene and hexamethylene dicarbylamines, but the invention includes also the production of dicarbylamines of higher molecular weight, for instance compounds containing 10, 15 or more carbon atoms. In such compounds the —NC groups may be linked by methylene groups or by substituted methylene groups. The compounds are new in themselves and possess properties which render them very valuable in the production and in the treatment of textile materials.

In carrying out the process of the invention the most convenient starting material to use is a diamine, for instance, ethylene diamine or hexamethylene diamine, but if desired, compounds in which the —NH$_2$ groups form parts of amide groups or hydrazine groups, may also be used. The halogenated methane derivative used can very conveniently be chloroform, but carbon tetrachloride or tetrabromide, bromoform, iodoform and other halogen compounds including halogen derivatives of other hydrocarbons than methane, for example highly halogenated derivatives of ethane, may also be used. Caustic potash or caustic soda gives excellent results in the process and may be used either in powdered form or dissolved in a suitable solvent, for instance alcohol.

In practice it is best to dissolve the ethylene diamine, hexamethylene diamine or other compound containing the —NH$_2$ groups in the chloroform or other halogenated hydrocarbons and then to add the caustic potash and heat the mixture under reflux. Usually refluxing for a period of about one hour is sufficient to result in the production of the desired dicarbylamine in excellent yield. After the refluxing operation the inorganic salt produced in the process, e. g. potassium chloride where chloroform and caustic potash are the reagents used, is separated as a precipitate from the liquid part of the reaction product by filtration, after which the filtrate is distilled to free it from excess chloroform or other halogenated hydrocarbon and any alcohol or other solvent used as a medium for introducing the caustic alkali, leaving a residue of dicarbylamine, unchanged caustic alkali and inorganic salt such as potassium chloride. The caustic alkali and salt can be removed by treatment of the product with warm water when the dicarbylamine forms an upper layer which may be separated as a solution in a suitable solvent, e. g. ethyl ether, the solution being dried and the solvent then distilled off. Distillation of the dicarbylamine thus obtained gives an oil as the final product in the case of the lower dicarbylamines or as a white solid of low melting point in the case of the dicarbylamines of high molecular weight.

While the invention has been described more particularly in connection with the production of ethylene dicarbylamine, hexamethylene dicarbylamine and other alkyl dicarbylamines the invention may also be applied to the production of substituted dicarbylamines e. g. hydroxy and carboxy and etherified hydroxy and esterified carboxy dicarbylamines.

The following example illustrates the invention as applied to the production of hexamethylene dicarbylamine.

Example

110–120 parts by weight of hexamethylene diamine are dissolved in 500 parts by weight of chloroform and charged into a reaction vessel fitted with a water-cooled reflux condenser. A solution of 280 parts by weight of caustic soda in about 1600 parts by weight of methyl alcohol is then run slowly into the diamine solution. Spontaneous reaction occurs and is inclined to be violent if the caustic soda solution is added too quickly. The reaction is accompanied by a precipitation of sodium chloride.

When all the caustic soda solution has been added the mixture is heated gently for one hour to complete the reaction whereupon the precipitated sodium chloride is filtered and the filtrate distilled.

Alcohol and chloroform are distilled off at atmospheric pressure and the residue is then distilled under reduced pressure, the fraction coming over between 205 and 245° C. at 14 mm. pressure being collected as a yellow viscous oil which, on redistillation under reduced pressure, yields a very viscous light brown oily product which on cooling solidifies into waxy circular plates which can be washed in hot diethyl ether in which it is insoluble and recrystallised from chloroform. The product, hexamethylene dicarbylamine, melts at 21 to 23° C.

Having described my invention, what I desire to secure by Letters Patent is:

1. Straight chain aliphatic compounds containing two carbylamine groups.
2. Ethylene dicarbylamine.
3. Tetramethylene dicarbylamine.
4. Hexamethylene dicarbylamine.
5. Process for the manufacture of an aliphatic compound containing two carbylamine groups which comprises subjecting an aliphatic compound containing two primary amino groups to reaction with a derivative of methane containing more than two halogen atoms and a caustic alkali.

6. Process for the manufacture of a polymethylene compound containing two carbylamine groups which comprises subjecting a diamino polymethylene compound to reaction with a derivative of methane containing more than two halogen atoms and a caustic alkali.

7. Process for the manufacture of a polymethylene compound containing two carbylamine groups which comprises subjecting a diamino polymethylene compound to reaction with chloroform and a caustic alkali.

8. Process for the production of hexamethylene dicarbylamine which comprises mixing a solution of a caustic alkali in an inert solvent and a solution of hexamethylene diamine in chloroform and heating the reactants under reflux.

9. Process for the manufacture of tetramethylene dicarbylamine which comprises mixing a solution of a caustic alkali in an inert solvent and a solution of tetramethylene diamine in chloroform and heating the reactants under reflux.

10. Process for the manufacture of ethylene dicarbylamine which comprises mixing a solution of a caustic alkali in an inert solvent and a solution of ethylene diamine in chloroform and heating the reactants under reflux.

HENRY DREYFUS.